April 27, 1965
A. ONYSKIN
3,180,113
SLIP CLUTCH
Filed Dec. 20, 1962
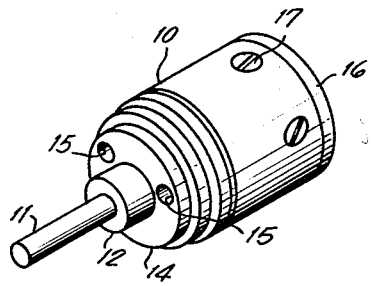
FIG. 1
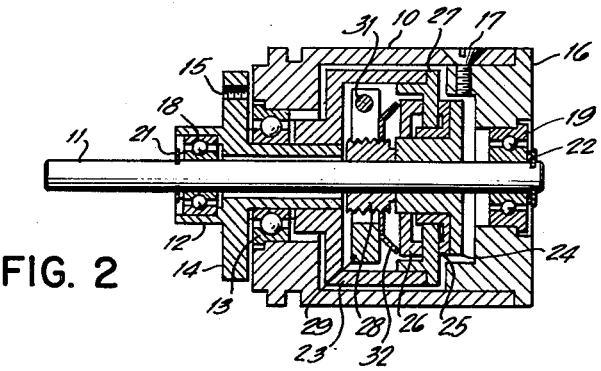
FIG. 2
FIG. 3
INVENTOR.
ALEXANDER ONYSKIN
BY

United States Patent Office 3,180,113
Patented Apr. 27, 1965

3,180,113
SLIP CLUTCH
Alexander Onyskin, 56 Anoatok Drive, Huntington, N.Y.
Filed Dec. 20, 1962, Ser. No. 246,207
2 Claims. (Cl. 64—30)

This invention relates in general to clutch mechanisms and more particularly to miniature friction clutch mechanisms whose frictional properties are adjustably biased.

Heretofore, friction type clutches have resorted to the use of high friction material between two shafts which are either coaxially aligned or concentrically aligned. The pressure exerted upon the friction material determines the amount of force which can be transmitted through the two shafts. Whenever the force exerted upon either of the shafts becomes greater than the resistivity of the high friction material, the shafts will be radially displaced relative to each other. This radial displacement is a highly desirable feature since gear trains or other geared instruments have to be protected from mechanical overloads as well as sudden shocks.

Since these gear trains are not always accessible, a small, compact self-contained unit which could be plugged in or inserted into a gear train would be very desirable. Additionally, the point of slippage is very important and varies as between different gear trains. Therefore, a self-contained friction clutch unit whose frictional properties can be adjusted at assembly of the unit would allow the manufacture of a standard unit with a minimum amount of hand fitting.

It is therefore an object of the invention to provide an improved means for allowing slippage between two shafts whenever a specific torque is exceeded between the two shafts.

Another object of the invention is to provide a miniature friction clutch which is capable of being adjusted to various torque requirements.

A still further object of the invention is to provide a miniature friction clutch which is self-contained and which is capable of being plugged in or inserted into a gear train.

A still further object of the invention is to provide a miniature friction clutch which is small, compact, endurable and economical of manufacture.

To these ends the invention contemplates the use of two shafts which are either concentrically aligned or coaxially aligned. These shafts are rotatably mounted within a housing and when both shafts are to extend from the housing on the same side they are concentrically aligned and when both shafts are to extend from opposite sides of the housing they are coaxially aligned. Between the two shafts is a friction producing device which is adjustably biased. The biasing force is a saucer shaped spring whose exerting force is adjusted by means of a rotating nut. The greater the spring force the higher the break away torque. Conversely, the lesser the spring force the lesser the break away torque.

The invention has other objects and advantages which will appear from the following description of a particular embodiment of the invention in conjunction with the accompanying drawing, in which:

FIGURE 1 shows an outside view of a particular embodiment of the invention where the shafts extend from the same side of the housing;

FIGURE 2 shows a longitudinal cross sectional view of the embodiment of the invention shown in FIGURE 1; and FIGURE 3 is a longitudinal cross sectional view of an alternate embodiment of the invention showing the shafts extending from opposite sides of the housing.

With reference to the drawing FIGURE 1 shows a cylindrical case 10 having two shafts 11 and 12 extending from one side thereof, the cylindrical case being of the same character as those used in servo systems such as potentiometers, servo motors, generators, etc.

Referring to FIGURE 2 it is seen that the shaft 12 is hollow and that it is rotatably mounted within the front end of case 10 by means of a flanged bearing 13. Shaft 12 has a flange 14 which has three (3) tapped holes 15 therein, the holes being spaced 120° apart. The purpose of the holes is to provide a means for fastening a gear (not shown) about shaft 12 for rotating therewith. At the rear of cylindrical case 10 is a retaining cap 16 which is attached to the case by means of screws 17, only one of which is shown. The shaft 11, which is mounted within shaft 12, is rotatably supported at its front end by means of a bearing 18 which is mounted within the front end of shaft 12. The rear end of shaft 11 is rotatably supported by means of a flanged bearing 19 which is mounted within the retaining cap 16. Shaft 11 is prevented from axial movement by means of retaining rings 21 and 22. A gear (not shown) can be fastened to the front end of shaft 11 by means of a clamp or the gear can be pinned directly to the shaft.

About the rear of shaft 12 is rigidly mounted for rotation therewith an inner cylinder 23. Rigidly affixed to shaft 11 is a cylindrical coupling 24 which rotates therewith. The cylindrical coupling has a flange which extends radially outward, a friction lining 25 is rigidly secured to the coupling flange. About said coupling 24 is slideably mounted a friction ring 26. Mounted to said inner cylinder 23 is a retaining cap 27, the retaining cap 27 having a flange which extends radially inward, the retaining flange being positioned between the friction lining 25 and the friction ring 26.

Within the inner cylinder 23, attached to shaft 11 for rotation therewith, is a screw 28. About the screw is an adjusting nut 29 which moves axially along the screw 28. It can be locked in position by means of clamping screw 31. Between the adjusting nut 29 and friction ring 26 is a saucer shaped spring 32. The purpose of the spring is to bias the friction ring and the flanges into frictional engagement to provide a load responsive yieldable connection between the shafts.

Referring to FIG. 3 the particular embodiment shown there of the invention is similar to the embodiment shown in FIG. 2 except that the shafts are not concentrically extended from the same side of the cylindrical case but instead extend one on each side of the case in coaxial alignment.

As shown in FIG. 3 there is a front shaft 33 which is rotatably mounted within the front end of a cylindrical case 34 by means of a flanged bearing 35, the case 34 being similar in construction and character as the case 10 of FIG. 2. At the rear of case 34 is a retaining cap 36 which is attached to the cylindrical case by means of screws 37, only one of which is shown. A shaft 38 is rotatably supported by means of flanged bearing 39 which is mounted within the retaining cap 36. The shafts are prevented from axial movement by means of retaining rings 41 and 42. Gears (not shown) can be fastened to shafts 33 and 38 by means of clamps or the gears can be pinned directly to the shafts.

About the rear of shaft 33 is rigidly mounted for rotation therewith an inner cylinder 43. Rigidly affixed to shaft 38 is a cylindrical coupling 44 which rotates therewith. The cylindrical coupling has a flange which extends radially outward. A friction lining 45 is rigidly secured to the coupling flange. About said coupling 44 is slideably mounted a friction ring 46. Mounted to the inner cylinder 23 is a retaining cap 44 having a flange which extends radially inward, the retaining cap flange being positioned between the friction lining 45 and the friction ring 46.

Within the inner cylinder 43, attached to shaft 33 for rotation therewith, is a screw 48. About the screw is an adjusting nut 49 which moves axially along the screw 48. It can be locked in position by means of clamping screw 51. Between the adjusting nut 49 and friction ring 46 is a saucer shaped spring 52. The purpose of the spring is to bias the friction ring and the flanges into frictional engagement to provide a load responsive yieldable connection between the shafts.

The operation of the slip clutch will now be explained more fully. Whenever it is desired to have a gear train or instrument protected from overloads or sudden shocks the slip clutch is employed by plugging it into an appropriate part of the gear train or instrument. Whether the single ended or double ended slip clutch is used depends upon the design considerations of the gear train or instrument being protected.

Assuming the single ended slip clutch is used then the gear train being protected is split and the end gear of the split gear trains is affixed to the shaft 11. A similar gear, one having the same pitch ratio, as the end gear affixed to shaft 11 is then affixed to shaft 12 and then meshed with the first gear of the other part of the split gear train. With the gear train in normal operation the torque being transmitted remains the same as if the slip clutch were not employed providing that sudden shocks or overloads are not encountered by the gear train. This is accomplished by the shaft 11 turning coupling 24, screw 28 and adjusting nut 29. The flange of retaining cap 27 is captured between the friction lining 25 and the friction ring 26. With the adjusting nut 29 being properly adjusted for providing the correct bias to the spring 32, under normal torque conditions the retaining cap 27 will turn at the same speed, without slippage, as does shaft 11. The retaining cap being secured to the inner cylinder 23 will turn cylinder 23 which being affixed to shaft 12 will in turn rotate shaft 12.

Should a sudden shock or load occur then retaining cap 27 will not turn with shaft 11 as the spring biasing force, set into spring 32, will not be great enough to overcome this sudden shock or load. The spring biasing force of the spring 32 is preset at assembly and can be designed so that shafts 11 and 12 slip relative to each other at calculated torque requirements by means of the turning of the adjusting nut 29.

The operation of the double ended slip clutch is similar to the operation of the single ended slip clutch and needs no further explanation as to its operation.

Although I have described particular embodiments of the invention, it is understood that the present disclosure has been made by way of example and that numerous changes in the details of construction and the combination and arrangement of parts may be resorted to without departing from the spirit and the scope of the invention as hereinafter claimed.

What is claimed is:

1. A slip clutch comprising, a cylindrical case, a retaining cap secured to the rear of said case, a flanged bearing mounted within the front end of said case, a second flanged bearing mounted within said retaining cap, a hollow shaft rotatably mounted within said first bearing, a ball bearing mounted within said hollow shaft, a solid shaft rotatably mounted within said second flanged bearing and said ball bearing, said shafts extending from the same side of said case, an inner cylinder member secured to the rear of said hollow shaft, a second retaining cap mounted on the rear of said inner cylinder, said second retaining cap having a flange extending radially inward, a cylindrical coupling member mounted about said solid shaft and secured thereto, said coupling at one end having a flange extending radially outward and adjacent said retaining cap flange, a friction lining secured to said coupling flange, a screw mounted about and attached to said solid shaft, an adjusting nut having a clamping means mounted for rotation about said screw, a friction ring slideably mounted about said coupling member and adjacent said retaining cap flange and a saucer shaped spring mounted about said screw between said adjusting nut and said friction ring, said spring resiliently urging said friction ring and said flanges into frictional engagement to provide a load responsive yieldable connection between said shafts.

2. A slip clutch comprising, a case, a hollow shaft rotatably mounted within the front end of said case, a solid shaft rotatably mounted within said hollow shaft and within the rear end of said case, said shafts extending from the same side of said case, an inner cylinder member secured to the rear of said hollow shaft, a cylindrical coupling member mounted about said solid shaft and secured thereto, said coupling at one end having a flange extending radially outward, a screw mounted about and attached to said solid shaft, an adjusting nut having a clamping means mounted for rotation about said screw, a spring mounted about said solid shaft and in front of said adjusting nut and a retaining cap mounted on the rear of said inner cylinder, said retaining cap having a flange extending radially inward and adjacent said coupling flange, said spring resiliently urging said flanges into frictional engagement to provide a load responsive yieldable connection between said shafts.

References Cited by the Examiner

UNITED STATES PATENTS

| 1,807,210 | 5/31 | Hinnekens | 64—30 |
| 1,887,355 | 11/32 | Kranick | 64—30 |
| 2,540,997 | 2/51 | Schmitter | 64—28 |
| 2,943,466 | 7/60 | Elliott. | |

ROBERT C. RIORDON, *Primary Examiner.*

FRANK SUSKO, *Examiner.*